United States Patent Office 3,010,871
Patented Nov. 28, 1961

3,010,871
METHOD OF DESTROYING MITES EMPLOYING THE p-BROMOPHENYL ESTER OF BENZENE-SULFONIC ACID
Everett E. Gilbert, Morris Township, Morris County, N.J., assignor to Allied Chemical Corporation, New York, N.Y., a corporation of New York
No Drawing. Filed Oct. 22, 1959, Ser. No. 847,901
6 Claims. (Cl. 167—30)

This invention relates to methods for the control of phytophagous mites which feed on the plants on which they have their habitat and to ovicidal and miticidal compositions for controlling those mites by application to plants subject to infestation by them.

The control of Acarina, of which the phytophagous mites represent one family which particularly infest and are destructive of plants and their foliage on which they feed, has been one of the serious problems with which horticulturists and apiculturists had to deal. Innumerable chemical compounds and materials obtained from natural sources have been tested, but relatively few have been found sufficiently toxic to have been manufactured and marketed for use in the control of mites or other Acarina infesting and damaging plants. It has been reported that information on the insecticidal activity of some 10,000 compounds is available in the literature and it is probable several times this number have been tested but the results have not been divulged. "From this vast array, some 10 compounds have found general use as insecticides, and approximately 100 are being employed for restricted purposes or are still in the process of development." (A.W.A. Brown, Insect Control by Chemicals, 1951.)

Among the few materials which have been made generally available for use in the control of Acarina, the 2,4-dichlorophenyl ester of benzene sulfonic acid is in general use and the p-chlorophenyl ester of benzenesulfonic acid and the p-chlorophenyl ester of p-chlorobenzenesulfonic acid also have been employed with considerable success. Screening tests have been reported to evaluate the p-bromophenyl ester of benzene sulfonic acid as an insecticide, both for its insecticidal and ovicidal activities, as a larvicide for control of mosquitoes, and as a miticide applied to clothing for protecting men against chiggers. This material was reported to be neither insecticidal, ovicidal or miticidal and to be less effective than the p-chloro ester as a larvicide.

I have now discovered, however, that the p-bromophenyl ester of benzenesulfonic acid is an especially active, effective ovicide for the eggs of the phytophagous mites. This is particularly important in the control of the phytophagous mites, whose life cycle is short and there is nearly always a sufficient population in the egg stage to survive the usual insecticides. Their predators, insects or acarines, lack this reserve of eggs when the adult population has been depleted. When the destructive phytophagous mites hatch from their surviving eggs, they have escaped from their biological control.

I have further found that this p-bromophenyl ester of benzenesulfonic acid is toxic towards the living phytophagous mites, particularly so towards the newly hatched mites. Accordingly, this material can be used effectively for the treatment of plants to control their infestation and damage by those mites.

My invention, therefore, comprises the process for the control of phytophagous mites on plants by subjecting the mites and their eggs to the action of the p-bromophenyl ester of benzenesulfonic acid.

This can be done in any of the manners commonly employed for the control of Acarina, by applying a toxicant to the plants infested by their eggs or by the Acarina and their eggs. The toxicant of my invention is usually applied in conjunction with a carrier-diluent, which may be a finely divided solid, a liquid or a gas, the p-bromophenyl ester of benzenesulfonic acid constituting the essential active toxicant of such compositions. Preferably, this ester constitutes the essential ingredient of an aqueous spray or dusting powder, containing a sufficient amount of the ester to provide the desired toxicity, with which the infested plant is sprayed or dusted.

This p-bromophenyl ester of benzene sulfonic acid can be prepared, as described in J.A.C.S., vol. 59, page 287 (1937), by reaction of p-bromophenyl in solution in piperidine with the acid chloride of benzenesulfonic acid and filtering off the solid p-bromophenyl ester from the liquid reaction medium. The solid is recrystallized from petroleum ether.

Spray formulations can be prepared by dissolving the p-bromophenyl ester of benzenesulfonic acid in suitable organic solvents such as xylene and dispersing this solution in water in the presence of a surface active wetting, dispersing, or emulsifying agent. Concentrated solutions of this p-bromophenylbenzenesulfonic ester in such solvents may be prepared containing such wetting agent or emulsifier in amounts adequate to give an aqueous spray of suitable concentration of the active agent for application to the plants.

My invention particularly comprises a wettable, ovicidal and miticidal powder essentially composed of about 25% to about 90%, preferably about 50% to about 75% p-bromophenyl ester of benzenesulfonic acid as the toxicant, and containing a small amount of surface active wetting, dispersing or emulsifying agent. The remainder is finely divided inert, solid diluent. This powder, dispersed in water, forms a suspension of the active ingredient, suitable for application as a spray without serious injury to the plants thus treated for control of the phytophagous mites.

For the preparation of the wettable powder, the p-bromophenyl ester of benzenesulfonic acid is intimately mixed with a small amount of surface active agent and with finely divided solid such as talc, clay, e.g. attapulgite, kaolin or fuller's earth, wood flour or other similarly inert, solid carriers of the types commonly employed in formulating insecticidal powder compositions. Suitable surface active materials are the anionic and cationic wetting, dispersing and emulsifying agents commonly employed in the formulation of wettable powder compositions, for example, the alkali metal and ammonium salts of long chain aliphatic carboxylic acids, sulfonates of the aromatic or long chain aliphatic hydrocarbons, such as sodium alkyl sulfates and sulfonates, alkyl aryl sulfonate salts, sulfonates of glycerides and their fatty acids, and sulfonate of derivations of fatty acid esters. In general, the wettable powder compositions of my invention contain (by weight) about 1% to about 5% of the surface active agent, about 25% to about 90% of the p-bromophenyl ester of benzenesulfonic acid, and the remainder substantially consists of the inert solid diluent. The aqueous dispersions of the wettable powder which are applied to living plants contain about ⅛ to 1 pound of the p-bromophenyl benzenesulfonic acid ester, preferably about ½ to ¾ pound, for every 100 gallons of water.

A dry powder in which the p-bromophenyl ester of benzenesulfonic acid is mixed with about 10 to about 20 times its own weight of inert, finely divided, solid diluent, can also be applied to the plants as a dusting powder. This dusting powder may also contain a small amount of surface active wetting, dispersing or emulsifying agent. For example, it may be prepared by mixing one of the above described wettable powders with additional finely divided, inert solid diluent to give a mixture containing about 5 to about 10 weight percent of the toxicant ester.

The following examples are further illustrative of my novel wettable powder compositions and aqueous dispersions of the p-bromophenyl ester of benzenesulfonic acid suitable for application to living plants, and of processes employing the p-bromophenylbenzenesulfonic ester for mite control.

*Example 1.*—A dry ovicidal-miticidal composition was prepared by slurrying in acetone the following materials:

| | Parts by weight |
|---|---|
| p-Bromophenyl ester of benzenesulfonic acid | 25 |
| Attapulgite clay | 70 |
| Sodium salt of an alkylaryl sulfonic acid surface active agent | 5 |

The acetone was allowed to evaporate from the mixture and the dry material was then ball milled to reduce it to a finely powdered form. This powder, dispersed in water, was tested by a standard test method for control of the two spotted spider mite (*Tetranychus telarius*; also known as *T. bimaculatus*) on young cranberry bean plants.

The cranberry bean plants were infested with the mites and one day later the several plants were sprayed with the aqueous dispersions of the above wettable powder composition containing varied amounts of the composition. Following this spraying the plants were placed in a greenhouse. Initial kills of the adult mites were observed three days following the spray application and the number of dead eggs and live young were observed seven days after the plants were sprayed.

The following table shows the amounts of the wettable powder mixture dispersed in water in preparing the sprays, the percent kill of adult mites after three days and the miticidal and ovicidal results in terms of live, young mites present and percent eggs killed after the seven day interval. For comparison, the data is given for check plants treated in the same manner except that no spray for control of the mites was applied.

| Lb. Powder per 100 gal. Water | Percent Kill, 3 days | Live Young, 7 days | Percent Egg Kill, 7 days |
|---|---|---|---|
| 4 | 17.6 | 0 | 100.0 |
| 2 | 10.0 | 0 | 100.0 |
| 1 | 7.9 | 8 | 97.6 |
| ½ | | 46 | 88.2 |
| Check | 1.7 | 344 | 0.0 |

*Example 2.*—The same wettable powder containing 25% p-bromophenyl ester of benzenesulfonic acid employed in Example 1 was dispersed in water to give a spray containing 1 pound of the wettable powder for every 100 gallons of water. Cranberry bean plants were infested with the two spotted spider mites (*T. telarius*). One day later the plants were sprayed with this material and placed in a greenhouse. A second spray was applied 5 days after the first. A third spray was applied to some of the plants 11 days after the first spray was applied to these plants. Eighteen days after application of the first spray the number of live mites per leaf was counted and compared with the number of live mites per leaf on cranberry bean plants similarly infested and held in the greenhouse over a period of 18 days but without any spray application for control of the mite infestation.

The following table compares the results obtained on plants to which two and to which three sprays with the p-bromophenyl ester of benzenesulfonic acid had been applied with the check plants to which no spray had been applied for control of the mites.

| | Average number of mites per leaf | |
|---|---|---|
| | 2 sprays | 3 sprays |
| p-bromophenyl ester of benzenesulfonic acid | 1.0 | 0.33 |
| no spray | 45.0 | |

The two applications of the spray resulted in only 4.2% as many live mites on the plants as when no spray for control of the mite infestation was employed. The three spray application gave practically complete control of the mite infestation.

*Example 3.*—Dormant apple branches heavily infested with over-wintering eggs of the European red mite (*Paratetranychus pilosus*) were collected and stored in a greenhouse. Six days later some were sprayed with a dispersion in water of the same wettable powder employed in Example 1, containing 25% p-bromophenyl ester of benzenesulfonic acid. Others were sprayed with a dispersion in water of a wettable powder containing 50% p-chlorophenyl p-chlorobenzenesulfonate as its toxic ingredient, marketed for use in control of European red mite on apple trees. Following this treatment the branches were held in the greenhouse and counts of the number of live mites infesting the branches were made 10–11 days after the application of the p-bromophenyl ester of benzenesulfonic acid spray. Other check plants were held in the greenhouse in the same manner but without having any spray applied for control of the mites.

The following table shows the concentrations of the wettable powder dispersed in water of the sprays applied to the infested apple branches, and the data for number of live mites on the several branches thus treated with the sprays and on the unsprayed check branches.

| | Wettable powder, lbs./100 gal. Water | Live Mites, Aver. No. per Cluster | Mite Reduction, Percent |
|---|---|---|---|
| p-Bromophenyl ester of benzenesulfonic acid (25% active material) | 2 | 4.8 | 98.6 |
| | 1 | 26.3 | 93.0 |
| | ½ | 112.5 | 70.7 |
| 50% p-chlorophenyl p-chlorobenzenesulfonate powder | ½ | 251.0 | 35.7 |
| No spray | | 390.7 | |

*Example 4.*—A wettable, 50% toxicant powder was prepared by mixing in a ribbon mixer the following solid ingredients in amounts giving a mixture containing the stated percentages:

| | Percent by weight |
|---|---|
| p-Bromophenyl ester of benzenesulfonic acid | 52.4 |
| A synthetic silicate | 21.9 |
| Kaolinite clay | 22.5 |
| Lignin sulfonate dispersing agent | 1.9 |
| Oleic ester of sodium isethionate | 1.3 |

The silicate and clay provided 44.4% of inert, solid diluent, the lignin sulfonate and oleic ester provided 3.2% of surface active material (a dispersing agent and an anionic surfactant, respectively), and the p-bromophenyl ester of benzenesulfonic acid provided the toxicant. This mixture was first put through a micropulverizer and then through an air mill to reduce it to a very fine powder. Aqueous sprays were prepared from the above wettable powder and from two materials recommended for and commonly used for control of mites on apple trees as follows:

*Spray A.*—The wettable powder containing the p-bromophenyl ester of benzenesulfonic acid prepared as described above, was dispersed in water in proportions of ½ lb. of the wettable powder for every 100 gallons of water.

*Spray B.*—A wettable powder, containing as its active toxicant 50% of p-chlorophenyl p-chlorobenzenesulfonate in the proportions of ¼ lb. for every 100 gallons of water.

*Spray C.*—A liquid concentrate containing as its active toxicant 50% of 2,4-dichlorophenylbenzenesulfonate in the proportions of ¼ pint for every 100 gallons of water.

In addition to the several materials for mite control, all of the sprays contained a commonly used fungicide for control of fungi on the apple trees.

Each of these sprays was employed for spraying groups of three McIntosh apple trees growing in an orchard. Spray C was applied the day after spray B and both sprays B and C were applied while the trees were in the pink stages of development, when European red mites were hatching in good numbers from their over-wintering eggs. A conventional spray rig was employed with the amount of spray being varied according to tree size. Most of the trees received 10–12 gallons of the spray. Spray A was applied 4 days after the application of spray B. At this time the trees were in partial bloom and were heavily infested with the adult mites. First cover sprays were applied to the trees of these groups 24 days after application of spray B. These cover sprays contained the following amounts of wettable powder or liquid concentrate:

Sprays A and B—½ lb. for every 100 gallons of water.
Spray C—½ pint for every 100 gallons of water.

Eight days after application of spray B, counts were made of the number of live mites. The following table A shows the number of live mites infesting 10 leaves from each of the three trees in each group treated with one of the above sprays and the average per 10 leaves of the mites infesting 20 leaves of a single untreated McIntosh tree growing in the same orchard but not adjacent to the plots containing the sprayed trees.

*Table A*

| Spray | Mites/10 Leaves | | |
|---|---|---|---|
| | Tree 1 | Tree 2 | Tree 3 |
| A | 7 | 4 | 31 |
| B | 12 | 7 | 1 |
| C | 10 | 3 | 2 |
| None | 481 | (average for 10 leaves) | |

Counts of total crawlers and live eggs on 10 leaves from each of the three trees in each group were made three times after the first spray and before application of the first cover spray. Following application of this cover spray to all of the trees, counts of the number of live crawlers on 10 leaves from each of the three trees in each group were made. The following table B shows the number of days after the initial use of spray B the counts were made, and the average per 10 leaves of the crawlers plus live eggs and of the crawlers on the 30 leaves for each group of three trees treated with the respective sprays.

*Table B*

| | Crawlers and Eggs | | | Crawlers |
|---|---|---|---|---|
| Days | 8 | 16 | 23 | 29 |
| Spray: | | | | |
| A | 14 | 42 | 75 | 16 |
| B | 7 | 0 | 93 | 5 |
| C | 4 | 0 | 18 | 7 |

I claim:
1. The process for controlling phytophagous mites which feed on plants on which they have their habitat which comprises subjecting said mites and their eggs to the action of the p-bromophenyl ester of benzenesulfonic acid.
2. The process of claim 1 in which the p-bromophenyl ester of benzenesulfonic acid is applied to plants infested by the phytophagous mites and their eggs.
3. The process of claim 1 in which the plants infested by the mites are sprayed with the p-bromophenyl ester of benzenesulfonic acid dispersed in water.
4. The process of claim 2 in which the plants are apple trees.
5. The process of claim 2 in which the plants are apple trees infested with European red mites and their eggs.
6. The process of claim 3 in which the plants are bean plants infested with two spotted spider mites.

References Cited in the file of this patent
UNITED STATES PATENTS
2,705,212   Kenaga _____ Mar. 29, 1955

OTHER REFERENCES

King: U.S. Department of Agriculture Handbook No. 69, 1954, p. 68.